June 22, 1948. G. A. GURLEY 2,443,982
WHEEL OR ROLLER ASSEMBLY
Filed June 1, 1944

Inventor
Gordon A. Gurley,
By
Attorney

Patented June 22, 1948

2,443,982

UNITED STATES PATENT OFFICE 2,443,982

WHEEL OR ROLLER ASSEMBLY

Gordon A. Gurley, Salem, Ill.

Application June 1, 1944, Serial No. 538,234

2 Claims. (Cl. 286—7)

This invention relates to a wheel or roller assembly of the general type comprising a fixed shaft or axle and a wheel or roller rotatably mounted thereon through the instrumentality of interposed anti-friction bearings, and has generally in view to provide a wheel or roller assembly of this general type which is of simple, inexpensive construction, capable of quick and easy assembly and disassembly, and which embodies a simple, practical combination and arrangement of elements to afford a highly effective sealing means to exclude deleterious foreign matter from the interior thereof and particularly from the anti-friction bearings housed therein.

While the invention is capable of general use, it is particularly intended for use in connection with vehicle wheels or rollers and more especially in connection with the wheels or rollers that are employed in vehicles of the self-laying track type to mount the bodies of the vehicles upon the self-laying tracks thereof, and in this connection an important object of the invention is to provide an assembly which is specially adapted for the latter particular use.

With the foregoing and other objects in view, which will become more fully apparent as the nature of the invention is better understood, the same consists in a wheel or roller assembly embodying the novel features of construction, combination and arrangement of parts, as will be hereinafter more fully described, illustrated in the accompanying drawings and defined in the appended claims.

In the accompanying drawings, wherein like characters of reference denote corresponding parts in the different views.

Figure 1:
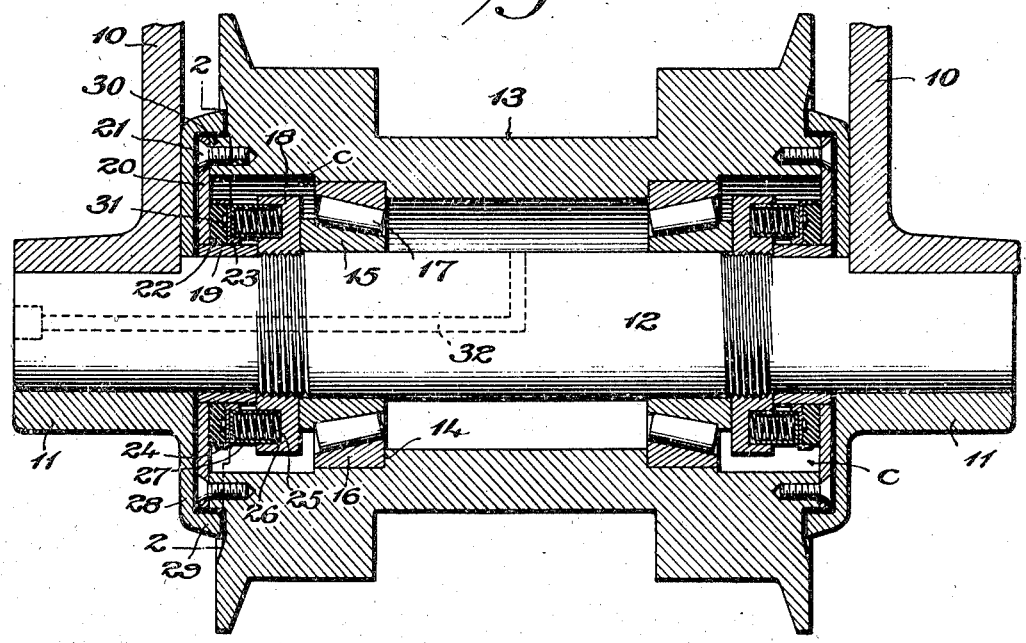
Figure 1 is a central longitudinal section through a wheel or roller assembly constructed in accordance with one practical embodiment of the invention.
Figure 2:
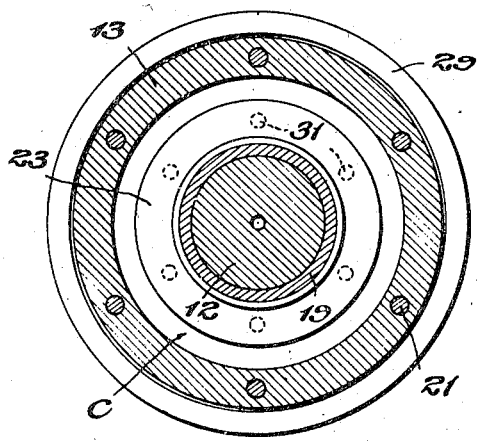
Figure 2 is a transverse section on the line 2—2 of Figure 1.
Figure 3:
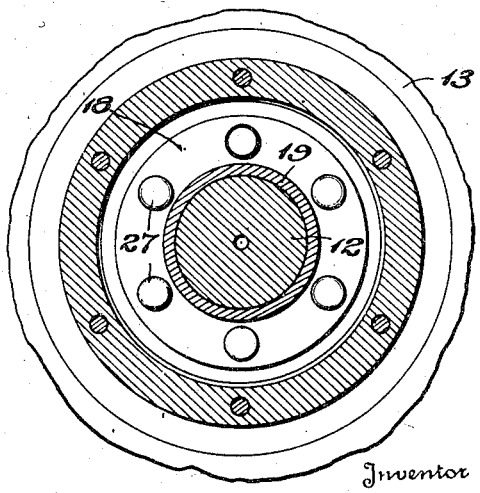
Figure 3 is a transverse section on the same line as Figure 2, but looking in the opposite direction.

Referring to the drawings in detail, it will be observed that the invention has been illustrated by way of example as being embodied in a wheel or roller assembly such as is used for mounting the body of a vehicle of the self-laying-track type upon a self-laying track thereof. It is to be understood, however, that this is merely for purposes of illustrating one particular use and adaptation of the invention and is not to be construed as in any way limiting.

Only frame portions of the vehicle are illustrated and these are designated as 10, while in accordance with known practice brackets 11 are carried by said frame portions 10 and have mounted therein the end portions of a non-rotatable, horizontally disposed shaft 12 upon the medial portion of which is rotatably mounted a wheel or roller 13 over which operates, as will be understood, an endless, self-laying track (not shown).

The wheel or roller 13 is hollow and preferably of greater internal diameter throughout its length than the shaft 12 to afford a space between the same and said shaft to contain a lubricant.

At its ends, said wheel or roller is counterbored to provide outwardly facing annular shoulders 14 and also to provide, in its end portions, chambers c to accommodate anti-friction bearings for mounting the same upon the shaft 12 and also sealing means to exclude deleterious foreign matter from said bearings.

The anti-friction bearings preferably, but not necessarily, are of the roller type and include inner and outer race rings 15 and 16, respectively, and interposed rollers 17, which latter preferably are tapered and converge inwardly so as to sustain both radial and end thrust loads.

The inner race rings 15 snugly fit over the shaft 12 and the outer race rings 16 snugly fit into the counterbored end portions of the wheel or roller 13 and at their inner ends abut the shoulders 14. On the other hand, nuts 18 are threaded on the shaft 12 against the outer ends of the inner race rings 15 and afford a convenient means of adjusting the bearings as well as to hold the inner race rings against outward movement. Sleeves or bands 19 are pressed on the shaft 12 against the outer faces of the nuts 18 and serve to secure the latter in adjusted positions.

The chambers c are closed at their outer ends by ring-like plates 20 which are removably secured against the ends of the wheel or roller 13 by screws 21, the heads of which preferably do not project beyond the outer faces of said plates. If desired, the plates 20 may have internal diameters only slightly greater than the diameter of the shaft 12 and may be disposed entirely outwardly with respect to the sleeves or bands 19. Preferably, however, said ring-like plates 20 have internal diameters only slightly greater than the external diameters of the sleeves or bands 19 and surround said sleeves or bands. In any event, sealing rings 22 of synthetic rubber or other suitable material which is incompressible, or substantially incompressible, but deformable, are disposed in the chambers c in surrounding, sealing engagement with the sleeves or bands 19 and with their outer end faces in sealing engagement with the inner faces of the plates 20 and serve to prevent deleterious foreign matter from finding its way into the chambers c through the narrow clearance spaces between the sleeves or bands 19 and the plates 20.

Confining rings 23 of metal or other suitable rigid material surround the sleeves or bands 19 and are disposed against the inner ends of the sealing rings 19 and have marginal flanges 24 engaging the outer peripheral faces of the sealing rings 22 to resist radial outward deformation of the latter. In addition, suitable resilient means are interposed between the nuts 18 and the confining rings 23 and react from the former upon and through the latter to urge the sealing rings 22 constantly outwardly. As a result, said sealing rings are pressed constantly into intimate sealing engagement with the inner faces of the plates 20 and, since they are free to be deformed only radially inwardly, the constant tendency of said resilient means is to deform them radially inwardly into intimate sealing engagement with the sleeves or bands 19.

While any suitable resilient means may be employed to urge the sealing rings 22 constantly outwardly, an annular series of spiral expansion springs 25 preferably are employed for this purpose. In each nut 18 and opening through the outer end face thereof is an annular series of recesses 26 in which the inner end portions of the springs 25 of the related series are respectively disposed, whereby said springs are held properly spaced apart angularly, while engaged over the outer end portion of each spring is a cup member 27 which bears at its outer end against the inner face of the related confining ring 23 and through which the related spring exerts its pressure outwardly upon said confining ring. There may be any suitable number of the springs 25 in each series and they preferably are spaced apart equidistantly angularly. Moreover, the inner end portions of the cup members 27 preferably extend into and snugly fit the recesses 26, so as to support the outer end portions of the springs against lateral deflection.

Preferably the axle supporting brackets 11 include cover plate portions 28 which overlie the closure plates 20 and are disposed closely adjacent thereto. Preferably, too, the cover plate portions 28 include marginal, inwardly extending annular flanges 29 which surround and are disposed closely adjacent to complemental, annular rib portions 30 of the wheel or roller 13, whereby any large particles of foreign matter are prevented from reaching the clearance spaces between the sleeves or bands 19 and the closure plates 20.

As will be appreciated, any suitable means may be employed in lieu of the sleeves or bands 19 to secure the nuts 18 in adjusted positions, and the sealing rings 22 may cooperate directly with the shaft 12 instead of with said sleeves or bands 19. In other words, the sealing rings 22 cooperate to all intents and purposes with the shaft 12 whether the sleeves or bands 19 are or are not used, for if they are used, they constitute, to all intents and purposes, parts of said shaft.

The sealing and confining rings 22, 23 may, if desired, be interlocked with each other as, for example, through the instrumentality of projections 31 on the latter engaged in recesses in the former. In any event, as the wheel or roller 13 rotates, the sealing and confining rings and the cup members 27 are held against rotation by the nuts 18.

Lubricant for the anti-friction bearings may be supplied to the space between the shaft 12 and the wheel or roller 13 in any suitable manner as, for example, through a duct 32 in said shaft 12.

The assembly embodies few parts which obviously may readily and easily be assembled and disassembled, and since deleterious foreign matter effectively is excluded from the anti-friction bearings, it is apparent that the assembly will possess long and satisfactory life at least insofar as wear produced by foreign matter gaining access to the operating parts of the assembly is concerned.

Without further description it is thought that the features and advantages of the invention will be readily apparent to those skilled in the art, and it will, of course, be understood that changes in the form, proportion and minor details of construction may be resorted to, without departing from the spirit of the invention and scope of the appended claims.

I claim:

1. In a structure comprising a shaft and a member rotatably mounted thereon, a nut threaded on said shaft and having therein an annular series of recesses opening through a side thereof, a band pressed on said shaft against said nut to hold the latter against rotation relative to said shaft, a plate carried by and rotatable with said member, said plate being disposed perpendicularly relative to said shaft and surrounding said band, a sealing ring surrounding and in sealing engagement with said band and also in sealing engagement at one side with said plate, spring-accommodating barrels in the recesses in said nut and engaged with said sealing ring, and springs in said barrels reacting from said nut to urge said barrels against said sealing ring and thus urge the latter against said plate to afford a seal between said shaft and said member.

2. In a structure comprising a shaft and a member rotatably mounted thereon, a nut threaded on said shaft and having therein an annular series of recesses opening through a side thereof, a band pressed on said shaft against said nut to hold the latter against rotation relative to said shaft, a plate carried by and rotatable with said member, said plate being disposed perpendicularly relative to said shaft and surrounding said band, a sealing ring surrounding and in sealing engagement with said band and also in sealing engagement at one side with said plate, and spiral springs in the recesses of said nut reacting from said nut against said sealing ring to urge the latter against said plate and thus afford a seal between said shaft and said member.

GORDON A. GURLEY.

REFERENCES CITED

The following references are of record in the file of this patent:

UNITED STATES PATENTS

| Number | Name | Date |
| --- | --- | --- |
| 1,387,087 | White et al. | Aug. 9, 1921 |
| 1,722,478 | Nelson | July 30, 1929 |
| 1,959,697 | Tracy | May 22, 1934 |
| 1,982,729 | Eberhard | Dec. 4, 1934 |
| 2,265,951 | Miner | Dec. 9, 1941 |
| 2,316,469 | Schoenky | Apr. 13, 1943 |
| 2,391,577 | Larson | Dec. 25, 1945 |